Feb. 19, 1952     T. ROBINSON     2,586,717
METHOD AND APPARATUS FOR THE SEPARATION OF
ISOTOPES, ETC., BY MOLECULAR DISTILLATION
Filed Oct. 27, 1949     3 Sheets-Sheet 1

INVENTOR.
THOMAS ROBINSON
BY
ATTORNEY.

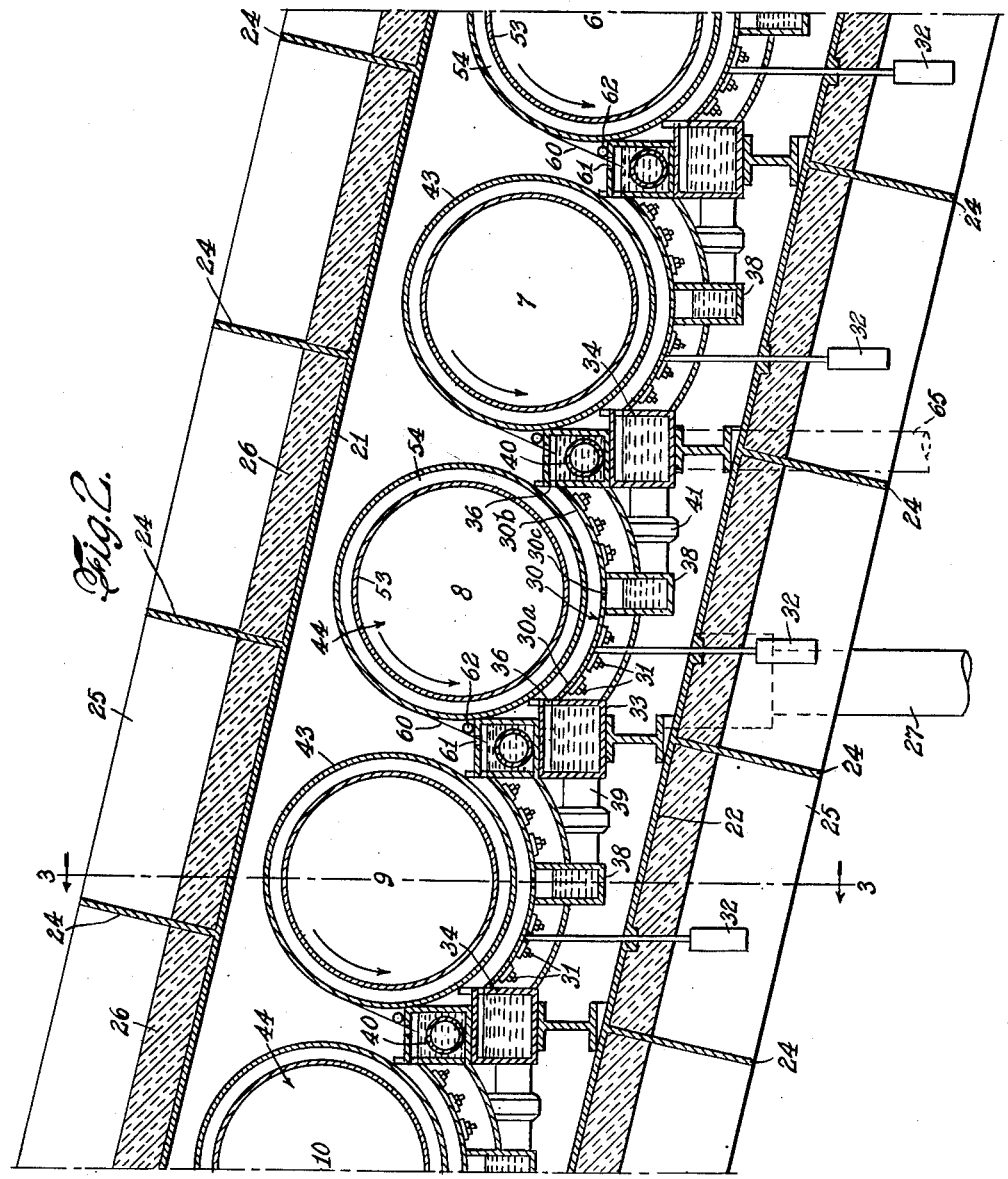

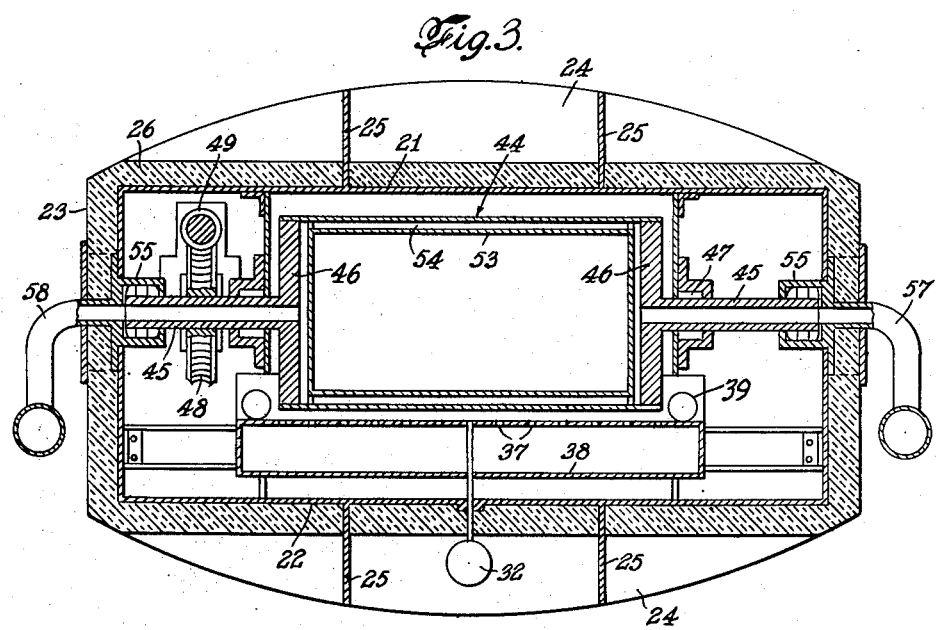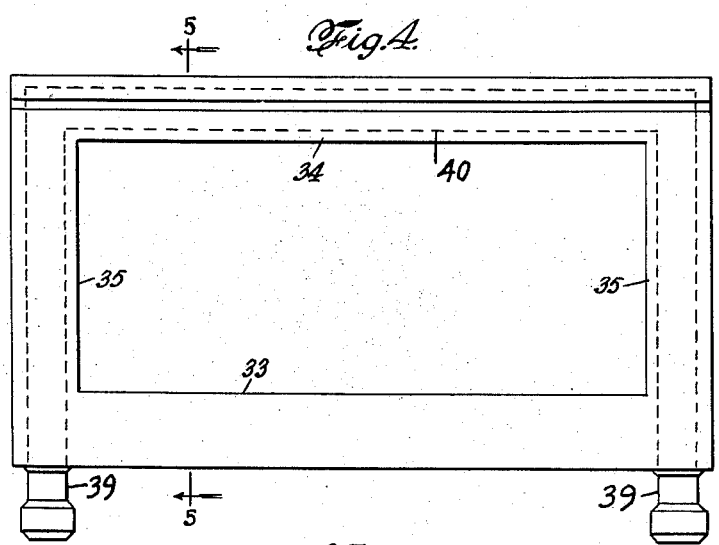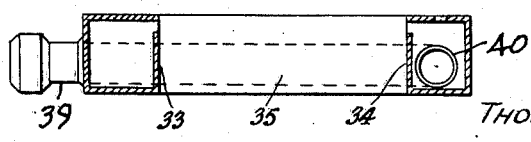

Patented Feb. 19, 1952

2,586,717

UNITED STATES PATENT OFFICE 2,586,717

METHOD AND APPARATUS FOR THE SEPARATION OF ISOTOPES, ETC., BY MOLECULAR DISTILLATION

Thomas Robinson, New York, N. Y., assignor to Micromax, Inc., New York, N. Y., a corporation of New York Application October 27, 1949, Serial No. 123,914

16 Claims. (Cl. 202—52)

The present invention relates to the rectification of liquid mixtures to separate or concentrate one or more of the constituents of the mixture by molecular distillation. The invention is particularly applicable to liquid containing two or more isotopes of different molecular weight but substantially the same vapor pressure as, for example, a mixture of two isotopes of potassium, $K^{39}$ and $K^{41}$. It is also applicable to the separation of molecular constituents of a liquid having different vapor pressures and to the separation of molecular masses constituting an azeotropic mixture, such as the separation of $HCl^{35}$ from $HCl^{37}$ in an azeotropic solution of HCl in $H_2O$.

When a liquid mixture, for example a liquid containing two or more isotopes, is enclosed in a chamber evacuated to a very low pressure, of the order of a millimeter of mercury, and the temperature of the liquid is regulated so that the vapor pressure of the liquid is of the order of a millimeter or less of mercury, individual atoms or molecules will leave the liquid and travel appreciable distances before returning to the liquid surface. If a condensing surface is placed at a distance from the evaporating surface within the path of travel of these atoms or molecules and is maintained at a lower temperature than the evaporating surface, the relative abundance of the isotopes in the condensate will be substantially the same as that in the vapor at the moment the molecules or atoms leave the liquid surface. This is due to the fact that the individual particles of the vapor in traveling the short distance between the evaporating and condensing surfaces are not appreciably deflected from their paths by collisions with each other, the movement of the vapor particles being substantially unidirectional. If the chamber is kept evacuated to a point where the non-condensable particles, as for example air molecules, are at a pressure of about $10^{-5}$ or $10^{-6}$ millimeters of mercury, the collisions of these particles which are in a state of random motion with the condensable particles of the vapor will not be numerous enough to affect appreciably the unidirectional motion of the condensable particles. Consequently, only a small number of the condensable particles leaving the liquid surface are returned to the liquid through collisions in the vapor phase and the composition of the vapor at the moment of condensation is substantially the same as at the moment of evaporation.

If the vapor pressures of the isotopes are the same, the kinetic theory requires that the abundance ratio of light molecules having a mass $m^1$ to heavy molecules having a mass of $m^2$ in the vapor leaving the liquid shall be $$\sqrt{\frac{m^2}{m^1}}$$

times the abundance ratio in the liquid. It will thus be seen that the ratio of the heavy to the light isotope in the vapor, and consequently in the condensate, is smaller than in the liquid phase being evaporated. A partial separation of the two isotopes is thus effected. The condensate will contain a larger proportion of the light isotope and the residue, i. e. the unevaporated liquid, will contain a larger proportion of the heavy isotope than the original liquid. While the amount of concentration or separation effected by a single evaporation as above described may be very small, the respective constituents can be effectively separated or concentrated by repetition of the evaporation and condensation.

It has been previously proposed to separate isotopes by free evaporation in a series of cells having sloping roofs on which the vapor is condensed. The roofs have sufficient inclination and are so arranged as to cause the liquid condensing on the roof of a cell to flow by gravity down the roof surface to an adjacent cell where the evaporation is repeated. In this method, the sloping roof is necessarily at an angle to the surface of the liquid so that the distance between the surface of the liquid and the roof is not uniform. Consequently, some portions of the roof may be too far away from the evaporating surface for best results while other portions may be too close. Moreover, the capacity of the apparatus is limited and its action is not positive. Unless conditions are exactly right, the condensate can drip back into the residue liquid in the cell. Even if it runs down the sloping roof as intended, the condensate drips into the near side of the next higher cell of the series and hence just inside an opening connecting the two cells. The condensate can hence return to the cell from which it came without any re-evaporation or any effective refluxing with the liquid of the higher cell.

It is an object of the present invention to provide an improved method of separating or concentrating the respective liquids of a liquid mixture, for example a mixture of isotopes. Another object of the invention is to provide a multi-stage method of separating or concentrating liquids from a mixture by evaporation in which there is effective refluxing of the progressively more concentrated liquids produced by successive stages of the method, thereby increasing the uniformity of the results attained and also increasing the efficiency and effectiveness of the concentration or separation. A further object of the invention is to provide improved apparatus for carrying out the aforementioned method of concentrating or separating the constituents of a liquid mixture, in particular a mixture of isotopes.

Other objects and advantages of the invention will appear from the following description in conjunction with the accompanying drawings which illustrate, by way of example, apparatus for carrying out the method in accordance with my invention.

In the drawings:

Fig. 2 is a vertical longitudinal section on a larger scale of a typical portion of the chamber and typical units disposed therein.

Fig. 3 is a cross-section taken approximately on the line 3—3 in Fig. 2.

Fig. 4 is a plan view of the trough system for feeding liquid to one of the units.

Fig. 5 is a cross-section taken on the line 5—5 in Fig. 4.

Figure 1:
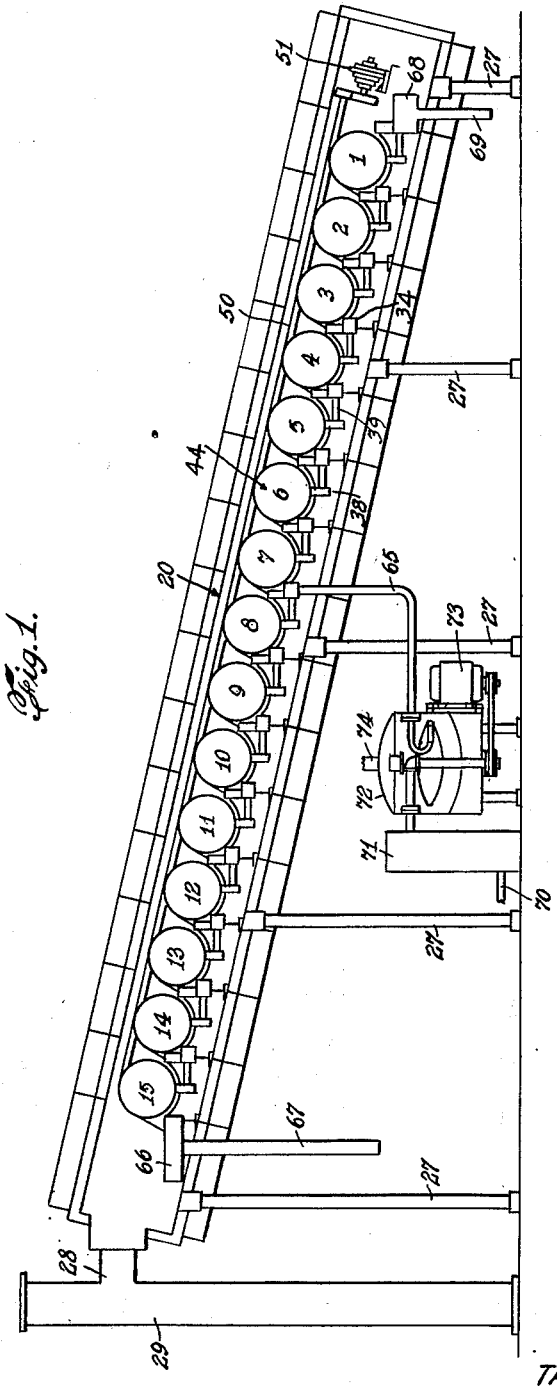
Fig. 1 is a diagrammatic side view of apparatus suitable for carrying out the process of the invention comprising a plurality of units disposed in an inclined chamber, the side wall being removed to show the interior.

The method in accordance with the present invention employs a series of stages in each of which the liquid mixture, for example a mixture of isotopes, is caused to flow in a moving sheet or film down over an inclined surface the temperature of which is precisely controlled to provide a predetermined vapor pressure and the resulting vapor is condensed on a moving surface which is uniformly spaced from the heated evaporating surface. The condensate is carried by movement of the condensing surface to a higher stage in the series while the unevaporated residue flows to a lower stage. The movement of the liquid in a thin sheet or film over the heated evaporating surface and the movement of the condensing surface relative to the evaporating surface, so that a fresh portion of the condensing surface is continually presented to condense the vapor, assures maximum efficiency and effectiveness in the evaporation and condensation of the liquid. The uniformity of the spacing between the two surfaces makes it possible to have all portions of the condensing surface at the optimum distance from the evaporating surface over which the liquid flows. The improved method in accordance with the invention thus affords greater efficiency, greater uniformity of results, more rapid separation or concentration of the constituents of the liquid, and higher capacity than those heretofore proposed.

The condensate from each stage is lifted mechanically by movement of the condensing surface to the next higher stage where it is thoroughly intermixed with the unevaporated residue liquid of a higher stage before being subjected to re-evaporation and recondensation in the higher stage to which it has been lifted. Preferably, the condensate from one stage is mixed with the unevaporated residue liquid from the stage that is two steps higher in the series and the mixture is then subjected to reevaporation in the intervening stage, i. e. one step higher than the first mentioned stage. Conversely, the unevaporated residue liquid from the first mentioned stage is thoroughly intermixed with the condensate from the stage two steps lower in the series and the mixture is subjected to re-evaporation in the stage one step lower. The mechanical lifting of the condensate by movement of the condensing surface assures that the condensate is carried in a positive manner to successively higher stages in the series. Hence, in successively higher stages, the proportion of the lighter isotope progressively increases while, in successively lower stages, the proportion of the heavier isotope increases. Preferably, the initial liquid mixture is fed approximately at the midpoint of the series, the concentrate of lighter isotopes being drawn off at the upper end and the concentrate of heavier isotopes being drawn off at the lower end. The continual refluxing by thoroughly intermixing the condensate of lower stages with the residue from higher stages assures uniformity of result and increases the effectiveness and efficiency of the process.

The method in accordance with my invention is advantageously carried out by means of the apparatus illustrated in the drawings. As illustrated in Fig. 1, the apparatus comprises a plurality of units which are numbered consecutively from 1 to 15, disposed in an elongated inclined chamber 20. While the chamber 20 can be of any convenient or desired cross-section, it is shown as being substantially rectangular with an upper wall 21, lower wall 22 and side walls 23. The top and bottom walls are reinforced by transverse webs 24 and longitudinal webs 25 which are preferably welded to the walls and to each other. The chamber is insulated by a layer of heat-insulating material 26 formed, for example, of asbestos or glass wool with a suitable binder. A plurality of columns 27 supports the chamber 20 in inclined position, as shown in Fig. 1. The chamber 20 is connected by a conduit 28 with an exhaust system 29 of such capacity as to maintain the chamber under high vacuum. Preferably the chamber is evacuated to a pressure of the order of a millimeter of mercury or less. Suitable condensers or other recovery devices may, if desired, be provided in the exhaust system to recover any isotopes that are drawn off in the exhaust.

The vacuum chamber 20 contains a plurality of distillation units which are essentially alike. While fifteen such units have been illustrated in Fig. 1, it will be understood that any desired number can be employed, the chamber being of a corresponding length to receive them.

Each of the distilling units comprises an inclined evaporating surface over which the liquid flows as a sheet or film and a moving condensing surface which is uniformly spaced from the evaporating surface. In the embodiment illustrated in the drawings, the evaporating surface 30 is in the form of an upwardly facing, concave, cylindrical surface comprising side portions 30a and 30b sloping in opposite directions toward a central portion 30c. Owing to the curvature of the cylindrical evaporating surface, the higher side portions adjacent the lateral edges of the surface are steepest, the inclination of the surfaces decreasing progressively as they approach the central portion 30c. The evaporating surface 30 is heated, for example by means of a plurality of electrical strip heaters 31 which are regulated by thermostatic control means 32 to keep the evaporating surface at a predetermined temperature, depending on the nature of the liquids and the desired vapor pressure.

The liquid is fed to the evaporating surface by means of a system of feed channels or conduits comprising a channel or conduit 33 for feeding liquids to one side portion 30a of the evaporating surface, a channel or conduit 34 for feeding liquids to the opposite side portion 30b of the surface and connecting conduit 35. Each of the feed conduits 33 and 34 has an elongated opening or weir 36 through which the liquid flows out onto the upper edge portions of the evaporating surface and then down towards the middle of the surface. Owing to the change in slope of the surface, the acceleration of the liquid decreases as it approaches the central portion 30c. This tends to compensate for the decrease in the amount of liquid owing to partial evaporation and thereby tends to maintain the layer of liquid at uniform thickness. The central portion 30c of the cylindrical evaporating surface is provided with a plurality of apertures 37 (Fig. 3) so that the unevaporated or residue portion of the liquid drains into a collecting trough or channel 38. By reference to Figs. 2, 4 and 5, it will be seen that the residue-collecting trough 38 of each unit is connected by means of pipes 39 with a perforated distributing pipe section 40 located in the feed conduit 34 of the next lower unit in the series. Thus the residue-collecting channel 38 of unit 9 is connected with a distributing pipe section 40 in the feed channel 34 of unit 8. Thus, the unevaporated liquid or residue from the evaporating surface of one unit is led to the feed conduit for the evaporating surface of the next lower unit in the series. Unions 41 are preferably provided in the pipes 39 for convenience in making connections between successive units.

The condensing surface of each unit comprises the peripheral surface 43 of a rotatable drum 44. The cylinder 44 is preferably coaxial with the cylindrical evaporating surface 30 and is rotatably supported by means of hollow shafts 45 which project outwardly from the end walls 46 of the cylinder. The coaxial mounting of the cylinder 44 provides a uniform space between the condensing surface 43 of the cylinder and the evaporating surface 30. The space between the surfaces is preferably not greater than the mean free path of the molecules or atoms leaving the surface of the liquid flowing over the evaporating surface or, at any rate, within the path of travel of these molecules or atoms. The hollow shafts 45 are rotatably supported by means of roller bearings 47 and the cylinder is rotated by means of a worm gear 48 which is mounted on one of the shafts and is driven by a worm 49. The cylinders of all of the units in the chamber 20 are preferably driven from a common shaft 50 which extends lengthwise of the chamber and on which the driving worm 49 for each of the units is mounted. The shaft 50 is driven by a variable speed drive, for example a third motor 51, so that the speed of rotation of the cylinders can be controlled and set at a predetermined value.

The rotating cylinder 44 is hollow and contains an inner hollow cylinder 53 with a space 54 between the walls of the inner and outer cylinder. The hollow shafts 45 communicate with this space and at their outer ends are connected by fluid-tight seals 55 with an inlet conduit 57 and an outlet conduit 58 which extend to the outside of the vacuum chamber 20. These connections provide for the circulation of a cooling fluid through the hollow shafts 45 and through the space 54 between the inner cylinder 53 and the condensing wall 43 of the outer cylinder 44. The rotation of the cylinder 44, in conjunction with the circulation of a coolant through the space between the inner and outer cylinder walls, assures the effective cooling of the condensing surface 43. It will be seen that as the cylinder 44 rotates, fresh portions of the condensing surface are continually provided for condensation of the vapor produced from the liquid flowing over the evaporating surfaces 30a and 30b. Moreover, each portion of the condensing surface 43 is successively presented to the evaporating surfaces 30a and 30b so that part of the condensate is derived from one portion of the evaporating surface and part from another portion.

As the cylinder 44 rotates, the liquid that condenses on the peripheral surface 43 of the cylinder is progressively removed by a scraper or doctor blade 60 and flows into the feed conduit 34 of the next higher unit, an opening 61 being provided in the top of the feed conduit for this purpose. The blade 60 is resiliently pressed against the peripheral wall 43 of the cylinder 44 by a spring 62. As the blade 60 is located at a higher level than the evaporating surfaces 30, the condensate is lifted mechanically by the rotation of the cylinder and is thereby delivered to the next higher distilling unit. A positive lift from one unit to the other is thereby provided.

Referring to Fig. 2, it will be seen that the condensate from unit 7 is delivered to the feed conduit 34 of unit 8 and that the unevaporated liquid residue from unit 9 is also delivered to the same feed conduit through the connecting pipes 39 and the perforated distributing pipe section 40. This arrangement assures the intimate intermixing or refluxing of the condensate from unit 7 with the residue from unit 9, i. e. the second higher unit in the series. This mixture is thereupon fed to the evaporating surfaces of unit 8. A portion of the mixture is fed directly from the feed conduit 34 to the right hand portion 30b of the evaporating surface while another portion flows through the connecting conduits 35 (Fig. 4) to the feed conduit 33 for the left hand portion 30a of the evaporating surface. While the pipes 39 are shown as extending through the conduits 35, these portions of the pipes are not perforated, the only perforated portion being the section 40. The residue from one unit thus flows from the collecting trough 38 to the feed conduit 34 at the far side of the next lower unit and is there mixed with the condensate from the second lower unit, thorough mixing being effected by the perforated distributing pipe section 40. A portion of the mixture then flows back through the connecting conduits 35 to the feed conduit 30 since the liquid in the connected channels always seeks a common level. Effective refluxing of the liquid is thereby assured.

The original liquid mixture to be separated or rectified is preferably fed to one of the intermediate units of the series. In the embodiment shown in the drawings, a supply pipe 65 is connected with the feed conduits of unit 7 approximately at the center of the series. As the condensate from each unit—containing a higher proportion of the lighter isotope than the liquid fed to that unit—is positively lifted by rotation of the condensing cylinder 44 to the next higher unit while the unevaporated residue liquid—containing a higher proportion of the heavier isotope than the liquid fed to the unit—flows to the next lower unit in the series, it will be seen that the lighter isotope tends to move toward the top of the series while the heavier isotope tends to move toward the bottom. A collecting receptacle 66 for the lighter isotope is provided at the upper end of the series so as to receive the condensate from the last distilling unit and is connected with a discharge pipe 67 leading to a suitable container or other point of storage or use of the isotope. At the lower end of the series, there is provided a receptacle 68 for the heavier isotope. This receptacle receives the unevaporated residue from the lowest distilling unit in the series and is provided with a discharge pipe 69 which likewise leads to the desired point of storage or use of the heavier isotope.

It will be understood that the various inlet and discharge pipes, including those for the coolant, are provided with suitable valves for controlling the flow of fluid through them.

The liquid mixture is preferably pre-heated and deaerated before being fed to the distilling units. As illustrated in Fig. 1, liquid from a supply pipe 70 passes through a heater 71 and from there to a rotary de-aerator 72 which is driven by a motor 73 and connected with a vacuum outlet 74. From the deaerator the liquid flows through the above mentioned inlet pipe 65 to the molecular distillation units.

In some instances, it has been found that better results are attained by graduating the temperatures of the evaporating surfaces of successive units, for example by having the temperatures of successive units progressively higher. It is also desirable in some instances to graduate the temperature of individual evaporating surfaces, for example by having the upper edge portion of the surface over which the liquid first flows at somewhat higher temperature than the central portion so that the liquid is brought quickly to predetermined temperature. The heating arrangement shown in the drawings provides great flexibility of control.

The operation of the apparatus will be readily apparent from the foregoing description. A continuous supply of the initial liquid mixture is pre-heated and de-aerated and then fed through inlet pipes 65 to the feed conduits 33 and 34 of distilling unit 7. The liquid flows over the heated evaporating surface 30 of unit 7 and the resulting vapor is condensed on the rotating cylinder 44. The unevaporated residue of the liquid drains into the collecting trough 38 from whence it flows to the feed conduits of the next lower unit in the series, i. e. unit 6. The condensate from the condensing cylinder of unit 7 is removed by the scraper 60 and goes into the feed conduit 34 of the next higher unit 8 where it is thoroughly mixed with unevaporated residue liquid from unit 9. The resulting mixture is thereupon redistilled in unit 8. This same process is repeated in the remaining units which are higher and lower in the series. The lighter isotopes are taken off through discharge pipe 67 at the top of the series while the heavier isotopes are taken off through discharge pipe 69 at the bottom of the series. The invention thus provides an effective and efficient method of molecular distillation and simple, compact, efficient and high capacity apparatus for carrying out this method.

While a specific example of the apparatus is shown in the drawings, it will be understood by those skilled in the art that the structural details of the apparatus may be varied within the scope of the appendant claims.

What I claim and desire to secure by Letters Patent is:

1. Process of rectifying a liquid mixture by molecular distillation which comprises flowing the liquid mixture by gravity in a moving film of uniform thickness over a stationary inclined heated surface, the temperature of the surface being controlled to cause molecules of at least one of the constituents of the liquid mixture to leave said film, condensing the resulting vapor on a second surface which is equidistantly spaced from the heated surface within the path of travel of said molecules, the temperature of the second surface being controlled to condense said vapor, continually moving said condensing surface relative to the heated surface, the movement of the condensing surface having an upward component to lift the condensed liquid to a higher level, and removing the condensed liquid by gravity from the condensing surface.

2. Process of rectifying a liquid mixture by molecular distillation in a series of consecutive stages, which comprises flowing a portion of the liquid mixture by gravity in a moving film over a stationary inclined heated surface, the temperature of the surface being controlled to cause molecules of at least one of the constituents of the liquid mixture to leave said film, condensing the resulting vapor on a second surface which is equidistantly spaced from the heated surface within the path of travel of said molecules, the temperature of the second surface being controlled to condense said vapor, continually moving said condensing surface relative to the heated surface, the movement of the condensing surface having an upward component to lift the condensed liquid to a higher level, removing the condensed liquid from the condensing surface by gravity at said higher level, collecting the unevaporated residue of the liquid mixture and mixing at least a part of said residue with the condensate from a like stage which is lower in the series and is separated by at least one intervening stage from the stage from which said residue is collected.

3. Process of rectifying a mixture of liquids by molecular distillation in a series of consecutive stages which comprises flowing a portion of liquid by gravity in a moving film over a stationary inclined heated surface, the temperature of the surface being controlled to cause molecules of at least one of the constituents of the liquid to leave the film, flowing another portion of liquid by gravity over an adjacent stationary oppositely inclined heated surface, the temperature of which is likewise controlled, condensing the resulting vapor from both of said surfaces on a cooled surface which is equidistantly spaced from the heated surfaces within the path of travel of said molecules, continually moving the cooled surface relative to the heated surfaces, the movement of the cooled surface having an upward component to lift the condensed liquid to a higher level, progressively removing the condensed liquid by gravity from the cooled surface at a level above that at which condensation occurred, flowing the condensed liquid to a like stage which is higher in the series, collecting the unevaporated residue of liquid from both of said heated surfaces in a common receptacle and mixing at least a part of said residue with the condensate from a like stage which is lower in the series.

4. Process of rectifying a mixture of liquids by molecular distillation in a series of at least five concurrently operating stages, which comprises flowing a portion of liquid by gravity in a moving film over a stationary inclined heated surface the temperature of which is controlled to cause molecules of at least one of the constituents to leave the film, flowing another portion of liquid by gravity over an adjacent stationary oppositely inclined heated surface the temperature of which is likewise controlled, condensing the resulting vapor from both of said surfaces on a cooled surface which is equidistantly spaced from the heated surfaces within the mean free path of said molecules, continually moving the cooled surface relative to the heated surfaces, the movement of the cooled surface having an upward component to lift the condensed liquid to a higher level, progressively removing the condensed liquid from the cooled surface at a level higher than that at which it was condensed, collecting and mixing together the unevaporated residue of liquid from both of said heated surfaces, mixing said residue with condensate produced in a like stage which is two places lower in the series and subjecting the resulting mixture to distillation in the intervening stage, mixing the condensate of the first mentioned stage with residue liquid from the second higher stage in the series and subjecting the resulting mixture to distillation in the intervening stage.

5. Apparatus for rectifying a mixture of liquids by molecular distillation, comprising a concave cylindrical surface having higher side portions sloping toward a lower apertured central portion, means for feeding liquid uniformly to said higher side portions so as to flow toward the apertured central portion, a receptacle for liquid discharged through the apertures of the central portion, means for heating said surface to cause molecules of at least one of the constituents of the liquid to leave the liquid surface, a condensing cylinder rotatably mounted approximately coaxially with the heated surface, with a uniform space between the cylindrical surfaces not greater than the path of said molecules, means for cooling the condensing cylinder to a temperature below the condensation temperature of said liquid, means for rotating said condensing cylinder and means for removing condensate from said cylinder.

6. Apparatus for rectifying a mixture of liquids by molecular distillation comprising a closed chamber, means for evacuating the chamber, a stationary sloping evaporating surface in the chamber, means for feeding said liquids to the upper portion of the surface so as to flow by gravity in a uniform film toward the lower portion of the surface, means for heating the evaporating surface, a condensing surface presenting a surface area which faces and is disposed above and uniformly spaced from the evaporating surface and a further area which does not face the evaporating surface means for cooling the condensing surface, means for moving the condensing surface to carry away liquid condensed on said surface and continually present a fresh area of the condensing surface to the evaporating surface, and means for progressively removing the condensed liquid from the condensing surface.

7. Apparatus for rectifying a mixture of liquids, comprising a closed chamber, means for evacuating the chamber, an upwardly facing concave cylindrical surface in said chamber having higher side portions sloping toward a lower central portion, means for feeding liquid to the higher side portions so as to flow in a uniform film toward the lower portion of the surface, means for heating the surface to cause molecules of at least one of the constituents of the liquid to leave the film, a condensing cylinder rotatably mounted above the heated surface with a space between the cylinder and said surface not greater than the mean free path of said molecules, means for cooling the condensing cylinder, means for rotating said cylinder and means for progressively removing condensate from said cylinder.

8. Apparatus for rectifying a mixture of liquids, comprising a closed chamber, means for evacuating the chamber, an upwardly facing concave cylindrical surface in said chamber having higher side portions sloping toward a lower central portion, means for feeding liquid to the higher side portions so as to flow in a uniform film toward the lower portion of the surface, means for heating the surface to cause molecules of at least one of the constituents of the liquid to leave the film, a hollow condensing cylinder rotatably mounted above the heated surface with a space between the cylinder and said surface not greater than the path of travel of said molecules, means for circulating a cooling fluid through the interior of the hollow cylinder, means for rotating the cylinder and means for progressively removing condensate from the cylinder.

9. Apparatus for rectifying a mixture of liquids, comprising a closed chamber, means for evacuating the chamber, an upwardly facing concave cylindrical surface in said chamber, having higher side portions sloping toward a lower central portion, means for feeding liquid to the higher side portions so as to flow in a uniform film toward the lower central portion of the surface, means for heating the surface to a predetermined temperature, a condensing cylinder rotatably mounted coaxially with said heated surface with a space between the cylinder and said surface, means for cooling the condensing cylinder to a predetermined temperature, means for rotating the cylinder, a scraper for removing condensate from the condensing cylinder and a receptacle for the removed condensate.

10. Apparatus for rectifying a mixture of liquids, comprising a closed chamber, means for evacuating the chamber, an upwardly facing concave cylindrical surface in said chamber having higher side portions sloping toward a lower central portion, means for feeding liquid to the higher side portions so as to flow in a uniform film toward the lower central portion of the surface, means for heating the surface to a predetermined temperature to produce partial evaporation of said liquid, a hollow condensing cylinder rotatably mounted coaxially with said heated surface with a space between the cylinder and said surface, an inner cylinder inside the condensing cylinder with a space between the walls of said cylinders, means for circulating a cooling fluid between said walls, means for rotating the condensing cylinder and means for removing condensate from the condensing cylinder.

11. Apparatus for rectifying a mixture of liquids, comprising an upwardly facing concave cylindrical surface having higher side portions and a lower central portion, means for feeding liquid to the higher side portions so as to flow in a uniform film toward the lower central portion of the surface, a plurality of electrical strip heaters in thermally conducting relationship with said surface, a thermostatic switch responsive to the temperature of said surface and controlling the supply of electric current to said heaters to maintain the temperature of said surface at a predetermined value to produce partial evaporation of said liquid as it flows over said surface, a condensing cylinder rotatably mounted coaxially with the heated surface with a space between the cylinder and said surface, means for cooling the condensing cylinder and means for removing condensate from the condensing cylinder.

12. Apparatus for rectifying a mixture of liquids, comprising an upwardly facing concave cylindrical surface having higher side portions sloping toward a lower apertured central portion, a supply channel extending along each of the higher side portions to supply liquid to said portions so as to flow down over said surface to the apertured central portion thereof, a channel for receiving liquid draining through the apertures of said central portion of the surface, means for heating the surface to a predetermined temperature to produce partial evaporation of liquid flowing over the surface, a condensing cylinder rotatably mounted coaxially with said surface with a space between the cylinder and the surface, means for rotating the cylinder and means for removing condensate from the cylinder.

13. Apparatus for rectifying a mixture of liquids, comprising an elongated inclined chamber, means for evacuating the chamber, a series of distilling units disposed transversely of the chamber, each of said units comprising an upwardly facing concave cylindrical surface having higher side portions sloping toward a lower apertured central portion, means for feeding liquid to the higher side portions so as to flow in a uniform film toward the apertured central portion, means for heating the surface to evaporate a portion of the liquid flowing over it, the residue liquid draining off through the apertured central portion of the surface, a condensing cylinder rotatably mounted above the heated surface with a space between the cylinder and the surface, means for rotating the cylinder, means for cooling the condensing cylinder to a predetermined temperature to condense the evaporated liquid, means for removing the condensate from the cylinder, means for mixing the condensate with the residue of a unit higher in the series and means for mixing the residue of the first mentioned unit with the condensate of a unit lower in a series.

14. Apparatus for rectifying a mixture of liquids, comprising a series of distilling units arranged one higher than another, each of said units comprising an upwardly facing concave surface having higher side portions sloping toward a lower central portion, a supply conduit extending along each of the higher side portions to a supply liquid to said portions so as to flow down over said surface to the central portion thereof, means for heating the surface to evaporate a portion of the liquid flowing over it, a channel for receiving residue liquid which is not evaporated, a condensing cylinder rotatably mounted above the heated surface with a space between the cylinder and the surface, means for cooling the condensing cylinder to a predetermined temperature to condense the evaporated liquid, means for removing the condensate from the cylinder, a receptacle for receiving the removed condensate, conduits connecting said receptacle of one unit with a supply conduit of a unit higher in the series and conduits connecting the residue receiving channel of one unit with a supply conduit of a unit lower in the series.

15. Apparatus for rectifying a mixture of liquids, comprising a series of units arranged one higher than another, each of the units comprising an inclined evaporating surface, a supply conduit extending along the higher side of said surface to supply liquid so as to flow down over the surface, means for heating the surface to evaporate a portion of the liquid flowing over it, a channel for receiving the residue liquid that is not evaporated, a movable condensing surface mounted above the evaporating surface with a space between the two surfaces, means for cooling the condensing surface to a predetermined temperature to condense the vapor produced by said evaporation, means for moving the condensing surface in a direction to carry the liquid condensed thereon to a higher level, means for removing the condensate from the condensing surface at a level higher than said supply conduits, a receptacle for collecting the condensate, means for mixing the condensate of one unit with the unevaporated residue of a non-adjacent higher unit in the series and supplying the mixture to the evaporating surface of an intervening unit and means for mixing the unevaporated residue from one unit with the condensate from a non-adjacent lower unit in the series and supplying the mixture to the evaporating surface of an intervening unit.

16. Apparatus of the kind described comprising an elongated chamber, means for evacuating the chamber, a series of units in the chamber, each of the units comprising an upwardly concave cylindrical evaporating surface having higher side portions and a lower apertured central portion, a supply channel extending along each of the higher sides of the evaporating surface to feed liquid so as to flow down over the surface to the lower apertured central portion thereof, means for heating the surface to evaporate a portion of the liquid flowing over the surface, a channel for collecting the unevaporated residue of liquid draining from the surface, a condensing cylinder rotatably mounted coaxially with the evaporating surface with a space between the cylinder and said surface, means for rotating the cylinder, means for cooling the cylinder to a predetermined temperature to condense thereon vapor produced by said evaporation, means for removing the condensate from the cylinder at a level above said supply channels, a receptacle for collecting the condensate, connections between the condensate receptacle of one unit and a supply channel of a unit higher in the series and connections between the residue collecting channel of one unit and a supply channel of a unit lower in the series.

THOMAS ROBINSON.

REFERENCES CITED

The following references are of record in the file of this patent:

UNITED STATES PATENTS

| Number | Name | Date |
|---|---|---|
| 2,073,202 | Fawcett et al. | Mar. 9, 1937 |
| 2,109,129 | Fawcett et al. | Feb. 22, 1938 |
| 2,180,050 | Hickman | Nov. 14, 1939 |
| 2,218,240 | Hickman | Oct. 15, 1940 |
| 2,343,668 | Hickman | Mar. 7, 1944 |
| 2,446,997 | Brewer et al. | Aug. 17, 1948 |
| 2,475,639 | Rainwater | July 12, 1949 |

FOREIGN PATENTS

| Number | Country | Date |
|---|---|---|
| 614,388 | Great Britain | Dec. 15, 1948 |